US00RE39209E

(19) United States
(12) Reissued Patent
Barton

(10) Patent Number: US RE39,209 E
(45) Date of Reissued Patent: Aug. 1, 2006

(54) PRODUCTION FLUID CONTROL DEVICE AND METHOD FOR OIL AND/OR GAS WELLS

(75) Inventor: John A. Barton, Arlington, TX (US)

(73) Assignee: Halliburton Energy Services, Inc., Houston, TX (US)

(21) Appl. No.: 09/949,339

(22) Filed: Sep. 7, 2001

Related U.S. Patent Documents

Reissue of:
(64) Patent No.: 5,947,204
Issued: Sep. 7, 1999
Appl. No.: 09/093,744
Filed: Jun. 8, 1998

U.S. Applications:
(60) Provisional application No. 60/060,691, filed on Sep. 23, 1997.

(51) Int. Cl.
*E21B 34/10* (2006.01)

(52) U.S. Cl. ..... 166/317; 166/319; 166/324; 166/374; 166/311

(58) Field of Classification Search ..... 166/317, 166/319, 324, 325, 374, 311, 321
See application file for complete search history.

(56) References Cited

U.S. PATENT DOCUMENTS 3,362,476 A 1/1968 Van Poollen
3,831,680 A * 8/1974 Edwards et al.
4,059,157 A * 11/1977 Crowe
4,154,303 A 5/1979 Fournier
4,160,484 A 7/1979 Watkins
4,186,803 A 2/1980 Mondshine
4,216,830 A 8/1980 Fredd
4,281,715 A * 8/1981 Farley ..... 166/317
4,374,543 A 2/1983 Richardson
4,423,773 A 1/1984 Stout
4,433,702 A 2/1984 Baker
4,541,484 A 9/1985 Salerni et al.
4,597,445 A 7/1986 Knox
4,658,902 A * 4/1987 Wesson et al.
4,691,775 A * 9/1987 Lustig et al.
4,718,488 A * 1/1988 Pringle et al. ..... 166/317 X
4,721,159 A 1/1988 Ohkochi et al.
4,724,908 A * 2/1988 Pringle ..... 166/317
4,813,481 A 3/1989 Sproul et al.
4,834,176 A * 5/1989 Renfroe ..... 166/317 X
5,137,088 A * 8/1992 Farley et al.
5,188,182 A 2/1993 Echols, III et al.
5,205,361 A * 4/1993 Farley et al.
5,271,465 A * 12/1993 Schmidt et al.
5,479,986 A * 1/1996 Gano et al.
5,511,617 A * 4/1996 Snider et al. ..... 166/317 X
5,607,017 A 3/1997 Owens et al.
5,826,661 A 10/1998 Parker et al.
6,026,903 A 2/2000 Shy et al.
6,076,600 A 6/2000 Vick, Jr. et al.

* cited by examiner

*Primary Examiner*—Jennifer Gay
*Assistant Examiner*—Roger Schoeppel
(74) *Attorney, Agent, or Firm*—Marlin R. Smith

(57) ABSTRACT

A device and method for selectively controlling the flow of production fluid through a tubing string in an oil and gas well according to which a housing is connected to a tubing string for insertion into the well, and well fluid is passed from the ground surface into the housing. The housing is provided with a plug to establish well fluid pressure in the housing to actuate a packer and/or other ancillary devices. The plug can be removed from the hosing by increasing the pressure of the well fluid in the housing above a predetermined value, thus permitting the flow of production fluid from the formation zone, through the housing and the tubing string, and to the ground surface.

16 Claims, 3 Drawing Sheets

PRODUCTION FLUID CONTROL DEVICE AND METHOD FOR OIL AND/OR GAS WELLS

Matter enclosed in heavy brackets [ ] appears in the original patent but forms no part of this reissue specification; matter printed in italics indicates the additions made by reissue.

CROSS-REFERENCE TO RELATED APPLICATION

This application is based on provisional application Ser. No. 60/060,691 filed Sep. 23, 1997.

BACKGROUND OF THE INVENTION

The present invention relates to a fluid control device for use in an oil and/or gas well and, more particularly, to such a device for selectively controlling the flow of production fluid from a producing formation adjacent the well, through the well, and to the ground surface.

In a typical oil and gas production well, a casing is provided to line the well and is provided with perforations adjacent the formation to receive the production fluid. A tubing string is run into the casing and has an outer diameter less than that of the inner wall of the casing to form an annulus. A packer is placed in the annulus to direct the production fluid into the lower end of the tubing string for passage upwardly through the tubing string for recovery above ground.

It is often advantageous, and sometimes necessary, to utilize hydraulically-actuated packers and other ancillary devices, especially when operating in deviated or horizontal well sections. To this end, the flow of production fluid into and through the tubing string is blocked, and well fluid is introduced into the tubing string from the ground surface, to create a relatively high fluid pressure which is used to actuate these devices. After this operation is completed the tubing string must be opened to permit the flow pf production fluid through the string and to the ground surface. Therefore, pump-out plugs, or the like, are often provided in the tubing string which normally block fluid flow through the string and which are ejected from the string when the flow of production fluid is desired. However, these plugs are relatively large and, when ejected, must either be removed from the wellbore by coiled tubing or the like, which is very expensive, or left in the wellbore, which may cause problems during the life of the well.

Also, disc subs have been used which incorporate a disc that normally blocks fluid flow through the tubing string and which breaks in response to fluid pressure acting thereon when flow is desired. However, these disc subs suffer from the fact that the pressure that has to be applied to break the disc is often excessive and unpredictable. Therefore, other techniques have been devised to break the discs to permit fluid flow. For example, steel bars have been used which are dropped into the well or run on wireline or coiled tubing. This has disadvantages since the broken disc forms debris in the wellbore and, if the well has a deviated or horizontal section, a drop bar or wireline run is very unreliable.

Still other techniques for selectively blocking the flow of production fluid through the tubing string involve wireline set/retrieved tubing plugs. However, these devices require a "profile" sub that has to be added to the tubing string and require the use of wireline intervention, as well as increased risk and expense.

Therefore, what is needed is a relatively inexpensive and reliable device for selectively controlling the flow of production fluid through a tubing string in an oil and/or gas well which minimizes the amount of debris left in the wellbore yet which can be activated with a predictable and relatively low amount of fluid pressure. Also what is needed is a device of the above type which does not require a profile sub or any actuation device to be dropped into the tubing string or run into the string on wireline or coiled tubing.

SUMMARY OF THE INVENTION

The present invention, accordingly, is directed to a device for selectively controlling the flow of production fluid through a tubing string in an oil and gas well according to which one end of a housing is connected to a tubing string for insertion into the well, and well fluid is passed from the ground surface the one end of the housing. The other end of the housing is closed to establish well fluid pressure in the housing to actuate a packer and/or other ancillary devices. The other end of the housing can be opened by increasing the pressure of the well fluid in the housing above a predetermined value, thus permitting the flow of production fluid from the formation, through the housing and the tubing string, and to the ground surface.

Several advantages result from the device and method of the present invention. For example, they are relatively inexpensive and reliable, yet minimize the amount of debris left in the wellbore. Also, the device can be activated with a predictable and relatively low amount of fluid pressure, and does not require a profile sub or any actuation device that must be dropped into the tubing string or run into the string on wireline or coiled tubing.

DESCRIPTION OF THE PREFERRED EMBODIMENT

Figure 1:
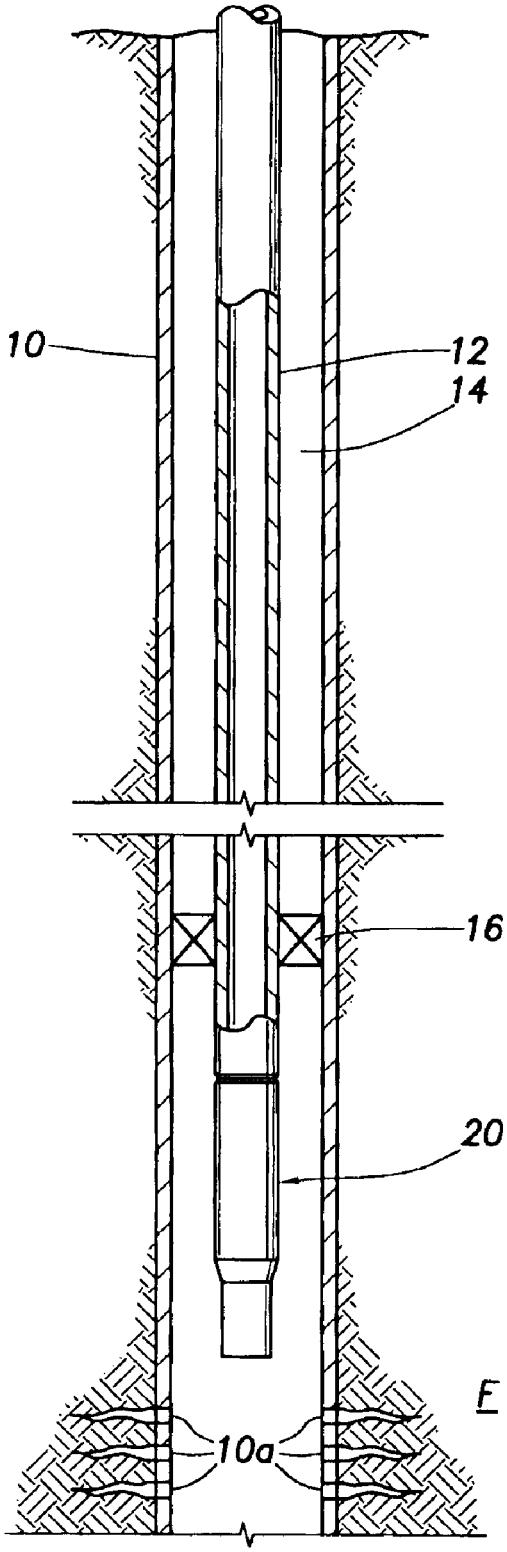
FIG. 1 is a partial elevation-partial sectional view depicting an installation in an oil and/or gas well including the device of the present invention.

The well fluid control device of the present invention is designed to be used downhole in an oil and/or gas wall depicted in FIG. 1. The reference numeral 10 refers, in general to a well casing that lines the well bore and receives a tubing string 12 having an outer diameter that is less than the casing to define an annulus 14 between the tubing string and the casing. The tubing string 12 can be lowered into the casing 10 from the ground surface in any conventional manner such as by using a wireline, coiled tubing, or the like. A packer 16 is disposed in the annulus 14 and extends around a lower portion of the tubing string 12, as viewed in FIG. 1. The packer 16 is preferably hydraulically actuated and since it is conventional, it will not be described in detail. A plurality of perforations 10a are formed through the casing 10 below the end of the tubing string 12. The perforations 10a permit production fluid from a formation zone F to flow into the casing 10 and through the tubing string to the ground surface, in a manner to be described.

The control device of the present invention is referred to, in general, by the reference numeral 20, and is attached to the lower end portion of the tubing string 12. The control device 20 is adapted to selectively control the flow of the production fluid through the tubing string 12 and to the ground surface, and to permit well fluid from the ground surface to be introduced into the tubing string 12 and pressurized sufficiently to actuate the packer, and any ancillary devices.

Figure 2:
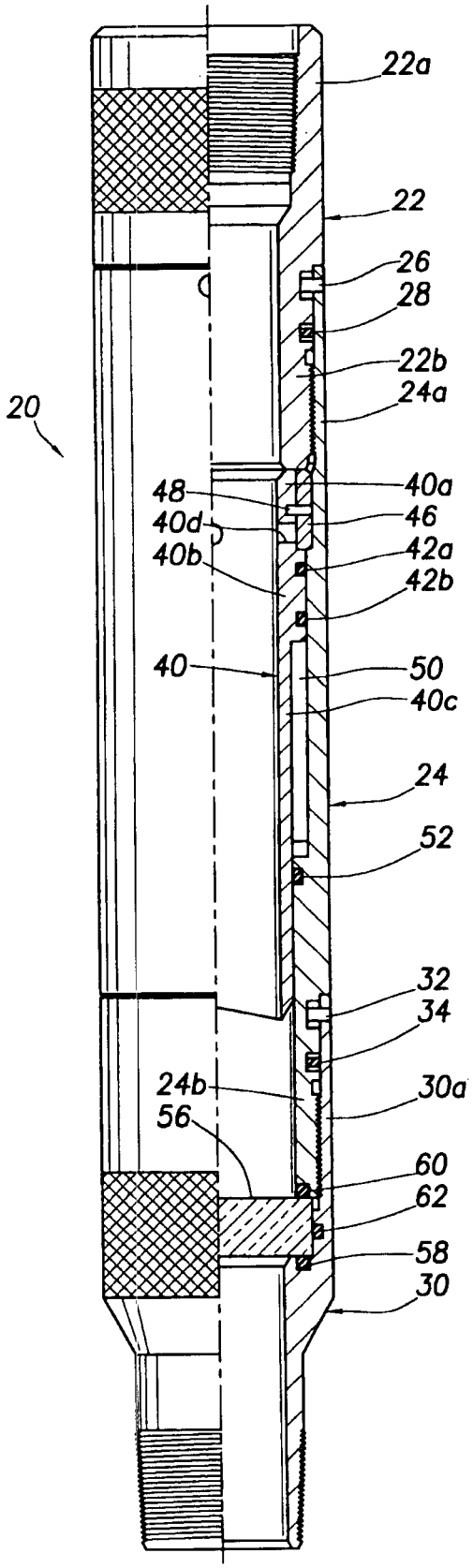
FIGS. 2 and 3 are vertical sectional views of the device of the present invention depicting two operational modes of the device.

To this end, and with reference to FIG. 2, the control device 20 comprises a sub 22 which is internally threaded at its upper end portion 22a, as viewed in FIG. 2, to mate with a corresponding externally threaded lower end portion of the tubing string 12 (FIG. 1). The control device 20 also includes a tubular housing 24 having an internally threaded upper end portion 24a that threadedly engages a corresponding externally threaded lower end portion 22b of the sub 22. A plurality of set screws 26, one of which is shown in FIG. 2, are angularly spaced around the circumference of the upper end portion 24a of the housing 24 and extend through aligned opening in the latter end portion and the lower end portion 22b of the sub 22, to secure the sub to the housing. A seal ring 28 extends between an outer surface portion of the sub 22 and a corresponding inner surface portion of the housing 24.

A lower sub 30 is also provided which has an internally threaded upper end 30a portion that threadedly engages a corresponding externally threaded lower end portion 24b of the housing 34. A plurality of set screws 32, one of which is shown in FIG. 2, are angularly spaced around the circumference of the upper end portion 30a of the lower sub 30 and extend through aligned opening in the latter end portion and the lower end portion 24b of the housing 24, to secure the connection between the sub and the housing. A seal ring 34 extends between and outer surface portion of the housing 24 and a corresponding inner surface portion of the sub 30. The lower end portion of the lower sub 30 is externally threaded so as to enable internally threaded subs of ancillary equipment (not shown) to be attached to the device 20 as needed.

A tubular piston 40 is slidably mounted in the housing 24 and its outer surface is stepped to define an upper end portion 40a, an intermediate portion 40b extending just below the upper end portion, and a portion 40c that extends from the intermediate portion 40b to the lower end of the piston. The outer diameter of the intermediate portion 40b is greater than the diameter of the portions 40a and 40c, and a pair of axially spaced seal rings 42a and 42b extend between the outer surface portion of the intermediate portion 40b and corresponding inner surface portions of the housing 24. The lower end of the piston 40 tapers to a relative sharp point for reasons to be described.

A ring 46 is disposed in a space defined between the outer surface of the upper end portion 40a of the piston 40 and the corresponding inner surface of the housing 24. The ring 46 receives a plurality of angularly-spaced shear pins 48 that extend through aligned openings in the ring 44 and the upper end portion of the piston 40. The shear pins 48 thus normally retain the piston 40 in its upper position shown in FIG. 2, but are adapted to shear in response to a predetermined shear force applied thereto to release the piston and permit slidable movement of the piston downwardly in the housing 24, as will be explained. A plurality of angularly-spaced openings 40d, one of which is shown in the drawings, extend through the upper end portion 40a of the piston 40 just below the openings that receive the shear pins 48, for reasons that will also be explained.

The inner surface of the housing 24 is stepped so that the inner diameter of its lower portion is less than that of its upper portion to define an annular chamber 50 between the inner surface of the upper portion of the housing 24 and a corresponding outer surface of the piston 40. The relatively large-diameter intermediate portion 40b of the piston 40 defines the upper boundary of the chamber 50, and the reduced-diameter portion of the housing 24 defines its lower boundary. The chamber 50 accommodates movement of the intermediate portion 40b of the piston 40 during its downward movement. A seal ring 52 extends between an outer surface portion of the piston portion 40c and a corresponding inner surface portion of the reduced-diameter portion of the housing 24. Thus, the chamber 50 extends between the seal rings 42b and 52 to isolate the chamber from fluids and to maintain the pressure in the chamber at atmospheric pressure for reasons to be described.

The lower sub 30 has a stepped inner surface that defines a shoulder that receives a frangible disc 56, and a seal being 58 extends between the shoulder and the disc. The disc 56 is made of frangible material, such as glass that is adapted to shatter when impacted by the pointed lower end of the piston 40 with sufficient force. The end of the housing 24 abuts the disc 56, and a seal ring 60 is disposed between the latter end and the disc. A seal ring 62 extends between the outer surface of the disc 56 and the corresponding inner surface of the sub 30. The disc 56 is capable of withstanding relatively large differential pressures acting on its respective upper and lower surfaces far in excess of the amount of force required to shears the pins 48 as will be described.

In operation, a well fluid is introduced into the casing 10 from the ground surface at a sufficient pressure to block the flow of production fluid from the formation zone F (FIG. 1) through the perforations 10a and into the casing 10. When it is desired to recover the production fluid, the tubing string 12 is run into the casing 10 with the device 20 attached to the lower end of the string, and with the packer 16 provided in a section of the string just above the device 20.

The presence of the disc 56 in the lower end portion of the device 20 permits well fluid from the ground surface to be introduced into the tubing string 12 at an increased pressure to establish a hydrostatic load to allow the packer 16, and/or any ancillary devices to be hydraulically set in a conventional manner. During this operation, the pressure of the well fluid in the device 20 acts on the upper end of the piston 40 in a downwardly direction and on the lower end of the piston in an upwardly direction. Since the area of the annular upper end surface of the piston 40 is greater that the area of its annular lower end surface, a differential force is established which applies a shear force to the pins 48. However, the pins 48 are designed to normally resist the force and thus maintain the piston in its upper, static position of FIG. 2. This increased fluid pressure in the device 20 is controlled so that the resultant differential pressure across the disc 56 caused by the latter pressure acting on the upper surface of the disc 56, and the well fluid in the annulus 14 acting on the lower surface of the disc, does not exceed the design limit of the disc.

When the packer 16, and any ancillary devices, have been set in accordance with the above and it is then desired to recover production fluid from the formation zone F, the pressure of the well fluid in the tubing string 12 is increased. Since the upper end surface of the piston 40 has a larger area than its lower end, the shear force applied to the pins 48 will be increased until the pins are sheared, with the openings 40d increasing the volume of well fluid available to act on the upper surface of the piston 40. The piston 40 is thus forced downwardly and its pointed lower end strikes the disc 56 with enough force to shatter it. It is noted that the relatively low atmospheric pressure existing in the chamber 50 does not impede this downward movement of the piston 40 and that the above increase in hydrostatic load is selected so that the disc 56 can withstand the resulting differential pressure acting on its upper and lower surfaces. The pressure of the well fluid in the tubing string 12 is then reduced as necessary to allow the well fluid in the annulus, and then the production fluid from the formation zone F, to flow through the device 20 and the tubing string 12 to the ground surface and be recovered.

The device 20 thus enjoys several advantages. For example, it is relatively inexpensive and reliable, yet can withstand a great deal of differential fluid pressure and be activated with a predictable and relatively low amount of fluid pressure. Also, the amount of debris left in the wellbore is minimized since the material used in the frangible disc 56 is such that, one broken by the piston 40, it is reduced to small slivers or particles that can be flowed or circulated from the well. Further, the device 20 does not restrict the inner diameter of the well bore and thus allows other tools to pass through it and it does not require a profile sub or any actuation device that must be dropped into the tubing string or run into the string on wireline or coiled tubing.

Figure 3:
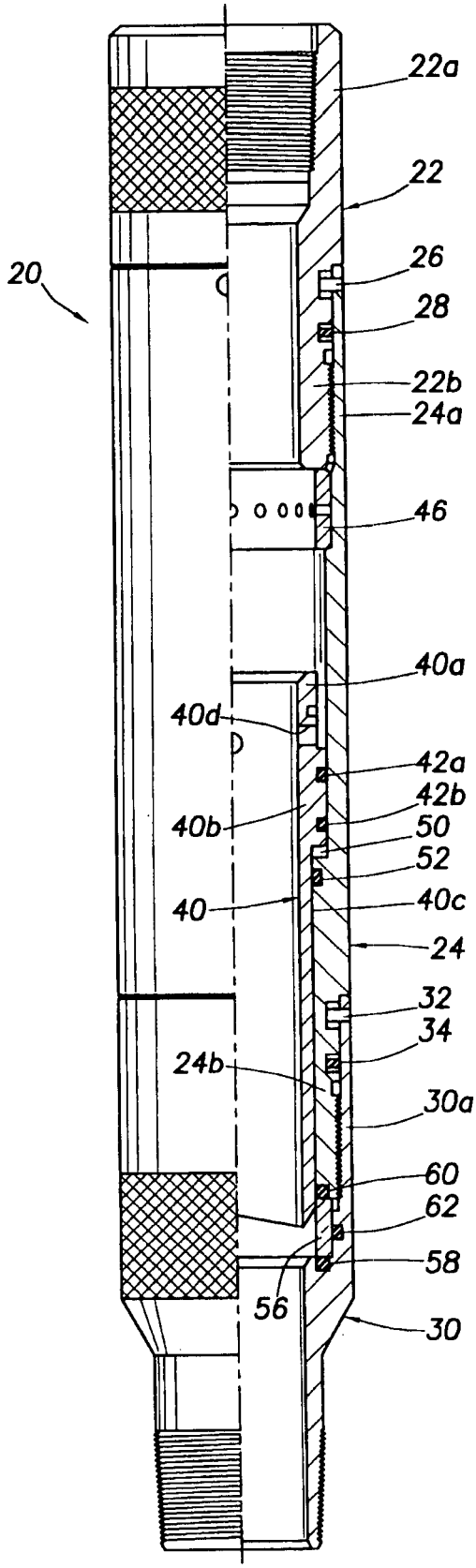
Figure 4:
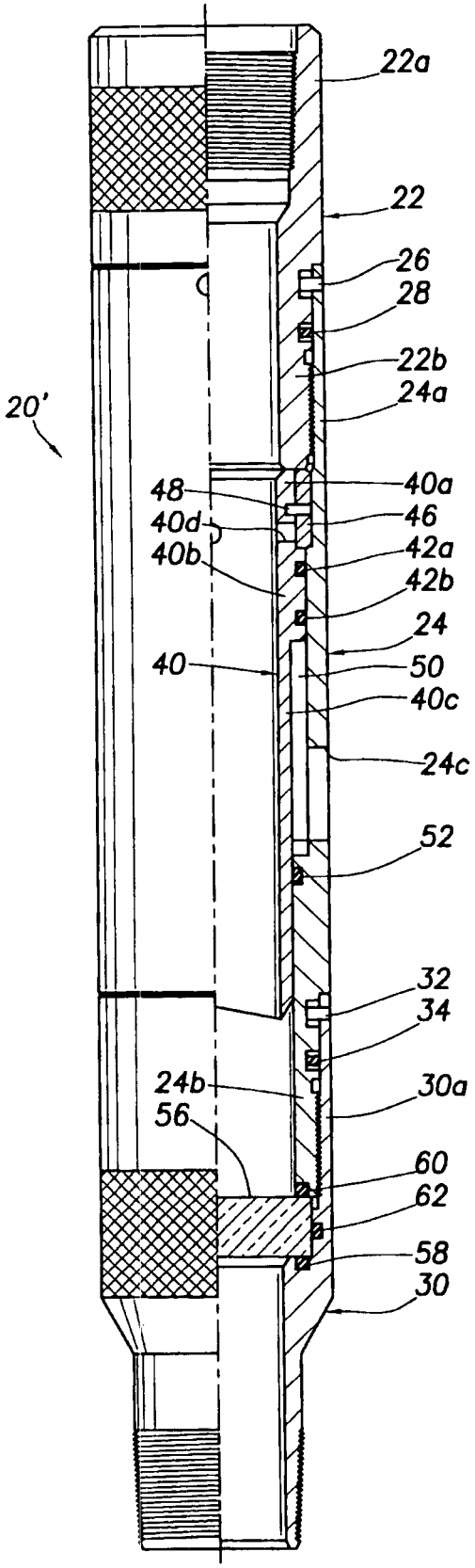
FIGS. 4 and 5 are views identical to those of FIGS. 2 and 3, respectively, but depicting an alternate embodiment of the device of the present invention.
Figure 5:
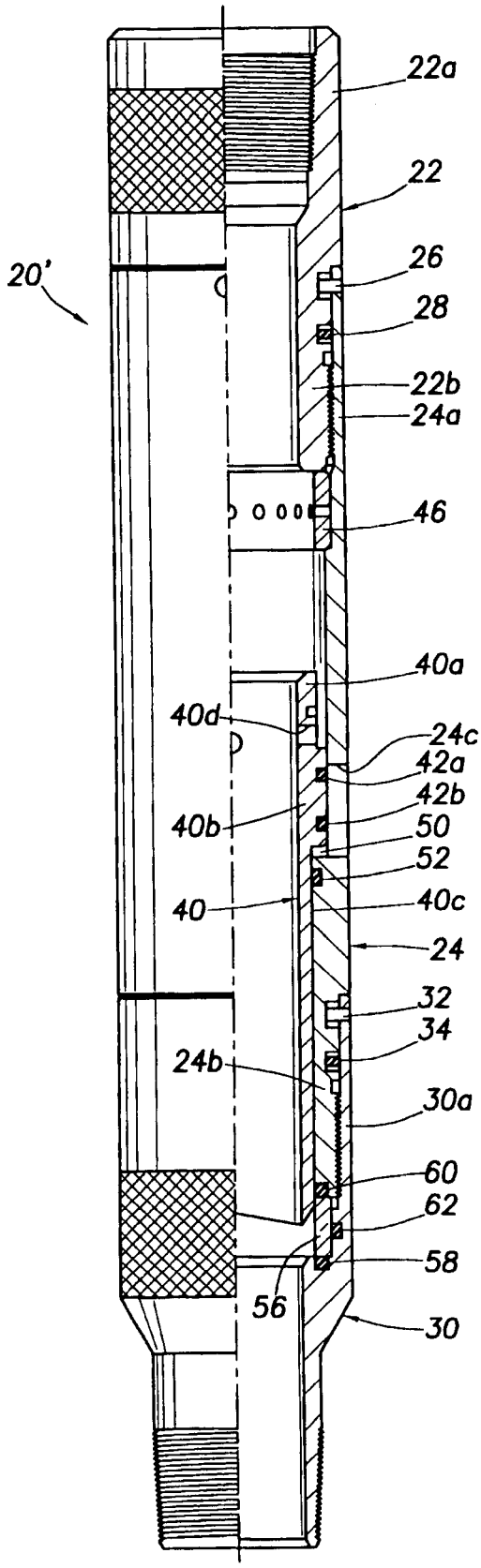

The embodiment of FIGS. 4 and 5 is similar to the embodiment of FIGS. 2 and 3 and identical components are given the same reference numerals. According to the embodiment of FIGS. 4 and 5, a device 20' is provided which is identical to the device 20 of the embodiment of FIGS. 2 and 3 with the exception that, in the former device, a plurality of angularly-spaced ports, one of which is shown by the reference numeral 24c in FIGS. 4 and 5, are provided through the wall of the housing 24. The ports 24c are axially located relative to the housing 24 so that they register with the lower portion of the chamber 50 when the piston 40 is retained in its upper, static position by the shear pins 48 as shown in FIG. 4. Thus, the above-mentioned well fluid that is initially in the annulus 14 to maintain the production fluid in the formation zone F, as discussed above, will enter the chamber 50 through the ports 24c and exert an upwardly-directed pressure against the lower annular surface of the relative large diameter portion 40b of the piston 40.

As in the previous embodiment, the upper surface of the piston 40 has a greater surface area than the lower surface due to the relatively large diameter portion 40b. Therefore, there is one downwardly-directed force caused by the well fluid in the interior of the housing 24 acting on the upper surface of the piston 40 as described above and an upwardly directed force caused by the well fluid in the interior of the housing acting on the lower surface of the piston, also as described above. In addition, there is an additional upwardly-directed force by the well fluid in the annulus 14 acting on the lower annular surface of the relatively large diameter portion 40b of the piston. Also as in the previous embodiment, the shear pins 48 are designed to shear at a predetermined shear force applied thereto based on the difference of the above-mentioned forces acting on the piston 40. However, in this embodiment, the shear force can be much less than that of the embodiment of FIGS. 2 and 3 due to the presence of the last-mentioned upwardly directed force. Otherwise the operation of the device 20' is identical to that of the device 20 of the embodiment of FIGS. 2 and 3.

The device 20' of the embodiment of FIGS. 2 and 5 thus enjoys all of the advantages of the device 20 of the embodiment of FIGS. 2 and 3 and, in addition, the amount of shear force required to shear the pins 48, and therefore actuate the piston 40 of the former device is mush less than that of the latter device.

It is understood that variations can be made in the foregoing without departing from the scope of the invention. For example, although the tubing string 12 and the devices 20 and 20' are shown extending vertically, it is understood that this is only for the purpose of example and that, in actual use, they can extend at an angle to the vertical. Therefore, the use of the terms "upper", "lower", "upwardly", "downwardly", and the like, are only for the purpose of illustration only and do not limit the specific orientation and position of any of the components discussed above.

It is understood that other modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A method for controlling the flow of production fluid from a formation zone in an oil and/or gas well to the ground surface, the method comprising the steps of introducing a fluid into the well for normally preventing the flow of production fluid from the formation zone, inserting a tubing string including a packet and a housing into the well, passing well fluid from the ground surface into one end of the housing, closing the other end of the housing for creating a well fluid pressure in the housing to set the packer in the annulus between the tubing string and the wall of the well, increasing the pressure of the well fluid in the housing sufficient to open the other end of the housing and thus permit the flow of production fluid from the formation zone through the housing and the tubing string and to the ground surface.

2. The method of claim 1 comprising the steps of retaining a piston in the housing, the increased-pressure well fluid in the housing releasing the piston and sliding the piston in the housing against the plug for opening the housing.

3. The method of claim 2 wherein a plug closes the other end of the housing and the piston fractures the plug.

4. The method of claim 2 wherein the well fluid in the housing acts on the respective ends of the piston with a force corresponding to the respective areas of the surfaces of the latter ends, wherein the area of the surface of one of the ends of the piston is greater than the area of the surface of the other end of the piston to create a differential force, and wherein the piston slides in response to the differential force exceeding a predetermined value.

5. The method of claim 4 wherein the housing and the piston extend substantially vertically, with the surface of the upper end of the piston having a greater area that the surface of the lower end of the piston so that the piston slides substantially downwardly in the housing.

6. A device for controlling the flow of production fluid from a formation zone in an oil and/or gas well to the ground surface, the device comprising:

a housing adapted to be connected at one end to a tubing string for insertion into the well and forming an annulus between the outer surface of the housing and the inner surface of the well, the one end of the housing being open for receiving well fluid from the ground surface;

a plug disposed in the other end of the housing for permitting the increase in pressure of the well fluid in the housing;

a piston disposed in the housing;

a plurality of shear pins connected to the piston for normally retaining the piston in the housing, the shear pins responding to the pressure of the well fluid in the housing exceeding a predetermined value for shearing to permit slidable movement of the piston in the housing against the plug to remove the plug from the housing and open the other end of the housing to permit the flow of production fluid from the formation zone, through the housing and the tubing string and to the ground surface;

a packer extending in the annulus, that portion of the annulus extending between the packer and the formation zone containing well fluid under pressure to normally maintain the production fluid in the formation zone; and a port defined in the wall of the housing to permit the latter well fluid to enter the housing and act against the piston.

7. A method for controlling the flow of production fluid from a formation zone in an oil and/or gas well to the ground surface, the method comprising the steps of:

connecting one end of a housing to a tubing string for insertion in a vertical orientation into the well;

passing well fluid from the ground surface into the one end of the housing;

normally closing the other end of the housing for creating a well fluid pressure in the housing;

retaining a piston in the housing so that the well fluid in the housing acts on the respective ends of the piston, the area of the surface of the upper end of the piston being greater than the area of the surface of the lower end of the piston so that the fluid acts on the respective ends of the piston to create a differential force;

the piston sliding downwardly in the housing in response to the differential force exceeding a predetermined value to open the other end of the housing and thus permit the flow of production fluid from the formation zone through the housing and the tubing string and to the ground surface;

forming an annulus between the outer surface of the housing and the inner surface of the well;

setting a packer in the annulus;

maintaining pressurized well fluid in that portion of the annulus extending between the packer and the formation zone to normally maintain the production fluid in the formation zone; and permitting the latter well fluid to enter the housing and act against the piston to change the differential force.

8. A device for controlling the flow of production fluid from a formation zone in an oil and/or gas well to the ground surface, the device comprising:

a housing adapted to be connected at one end to a tubing string for insertion into the well, the one end of the housing being open for receiving well fluid from the ground surface;

a frangible plug extending in the housing and closing the other end of the housing being closed to permit the pressure of the well fluid in the housing to build up; and a piston normally retained in the housing and having a pointed end, the piston being responsive to the pressure of the well fluid in the housing exceeding a predetermined value for sliding in the housing towards the plug so that the pointed piston end fractures the frangible material of the plug to open the other end of the housing and permit the flow of production fluid from the formation zone, through the housing and the tubing string and to the ground surface.

9. The device of claim 8 further comprising a plurality of shear pins connected to the piston for normally retaining the piston in the housing, the shear pins responding to the pressure of the well fluid in the housing exceeding the predetermined value for shearing to permit the slidable movement of the piston.

10. A method for controlling the flow of production fluid from a formation zone in an oil and/or gas well to the ground surface, the method comprising the steps of:

connecting one end of a housing to a tubing string for insertion into the well; passing well fluid from the ground surface into the one end of the housing; closing the other end of the housing with a frangible plug for creating a well fluid pressure in the housing; and providing a piston having a sharp end in the housing and adapted to respond to the pressure of the well fluid in the housing exceeding a predetermined value and to slide in the housing until its sharp end fractures the plug to open the other end of the housing to permit the flow of production fluid from the formation zone through the housing and the tubing string and to the ground surface.

11. The method of claim 10 further comprising the step of retaining the piston in the housing by a plurality of shear pins, the shear pins responding to the pressure of the well fluid in the housing exceeding the predetermined value for shearing to permit the slidable movement of the piston.

*12. A device for controlling the flow of fluid in a well, the device comprising:*

*a housing having a bore therethrough;*

*a frangible plug blocking flow through the bore; and*

*a piercing structure which pierces the plug in response to a pressure differential between an interior of the housing and an atmospheric chamber, thereby opening the bore to flow therethrough.*

*13. A device for controlling the flow of fluid through a tubular string in a wellbore, the device comprising:*

*a housing interconnectable in the tubular string for insertion into the wellbore to thereby form an annulus between an outer surface of the housing and the wellbore;*

*a plug disposed in the housing and blocking fluid flow therethrough, thereby permitting an increase in pressure in the tubular string to set a packer interconnected in the tubular string;*

*a gas chamber;*

*a piston exposed to fluid pressure in the tubular string and to pressure in the gas chamber;*

*at least one retainer member connected to the piston for retaining the piston against displacement in the housing, the retainer member permitting displacement of the piston when fluid pressure in the tubular string exceeds pressure in the gas chamber by a predetermined amount, the piston thereby piercing the plug and opening the plug to fluid flow therethrough.*

*14. A method for controlling the flow of fluid in a tubular string positioned in a wellbore, the method comprising the steps of:*

*interconnecting a housing in the tubular string, a plug in the housing preventing fluid flow through the housing and thereby permitting pressure in the tubular string to be increased;*

*retaining a piston in the housing, the piston being exposed to pressure in the tubular string and pressure in a gas chamber;*

*setting a packer interconnected in the tubular string by increasing pressure in the tubular string;*

*then further increasing pressure in the tubular string, thereby achieving a predetermined differential between pressure in the tubular string and pressure in the gas chamber;*

*displacing the piston in response to the predetermined pressure differential; and*

*piercing the plug in response to the piston displacing, thereby permitting fluid flow through the housing.*

*15. A device for controlling the flow of fluid in a tubular string in a well, the device comprising:*

*a housing adapted to be interconnected in the tubular string for insertion into the well;*

*a frangible plug disposed in the housing and preventing fluid flow through the housing; and*

*a piston normally retained against displacement in the housing, the piston being responsive to pressure in the housing exceeding pressure in a gas chamber by a predetermined amount to displace toward the plug and cause at least a portion of the plug to be broken, thereby permitting fluid flow through the housing.*

*16. A method for controlling the flow of fluid through a tubular string in a wellbore, the method comprising the steps of:*

*interconnecting a housing in the tubular string, a frangible plug in the housing preventing fluid flow through the housing;*

*providing a chamber in the housing, the chamber being isolated from fluid communication with an interior of the tubular string, and the chamber being isolated from fluid communication with an annulus formed between the tubular string and the wellbore;*

*providing a piston in the housing, the piston being nonresponsive to pressure in the annulus and nonresponsive to a difference in pressure between the annulus and the interior of the tubular string;*

*increasing pressure in the tubular string, thereby achieving a predetermined differential between pressure in the interior of the tubular string and pressure in the chamber; and*

*displacing the piston in response to the pressure increasing step, thereby breaking at least a portion of the plug and permitting fluid flow through the housing.*

* * * * *